United States Patent
Northrup et al.

(10) Patent No.: US 11,226,297 B2
(45) Date of Patent: Jan. 18, 2022

(54) X-RAY DOSAGE MITIGATION FOR SEMICONDUCTORS AND MATERIAL INSPECTION SYSTEMS

(71) Applicant: RAYTHEON COMPANY, Waltham, MA (US)

(72) Inventors: Mark Northrup, Marana, AZ (US); Kevin G. Mohr, Tucson, AZ (US); Michael T. Booher, Tucson, AZ (US); James T. Hampton, Jr., Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 128 days.

(21) Appl. No.: 16/438,579

(22) Filed: Jun. 12, 2019

(65) Prior Publication Data
US 2020/0393389 A1    Dec. 17, 2020

(51) Int. Cl.
*G01N 23/083*  (2018.01)
*G01N 23/04*  (2018.01)

(52) U.S. Cl.
CPC ........... *G01N 23/083* (2013.01); *G01N 23/04* (2013.01); *G01N 2223/04* (2013.01); *G01N 2223/402* (2013.01)

(58) Field of Classification Search
None
See application file for complete search history.

(56) References Cited

U.S. PATENT DOCUMENTS

| | | | |
|---|---|---|---|
| RE33,634 E | 7/1991 | Yanaki | |
| 6,398,710 B1 | 6/2002 | Ishikawa et al. | |
| 6,880,242 B2 | 4/2005 | Van Antwerp et al. | |
| 7,227,152 B2 | 6/2007 | Brabec et al. | |
| 7,254,214 B2 | 8/2007 | Shoji | |
| 7,589,327 B2 | 9/2009 | Kerwin | |
| 8,164,074 B2 | 4/2012 | Boyden et al. | |
| 8,168,958 B2 | 5/2012 | Boyden et al. | |
| 8,227,204 B2 | 7/2012 | Boyden et al. | |
| 8,242,464 B1 | 8/2012 | Patel | |
| 8,476,598 B1 | 7/2013 | Pralle et al. | |
| 8,529,426 B2 | 9/2013 | Boyden et al. | |
| 8,680,459 B2 | 3/2014 | Iwakiri et al. | |
| 8,680,472 B2 | 3/2014 | Mochizuki et al. | |
| 8,684,898 B2 | 4/2014 | Boyden et al. | |
| 9,236,225 B2 | 1/2016 | Ward et al. | |
| 9,354,329 B2 | 5/2016 | Thalhammer et al. | |
| 9,402,548 B2 | 8/2016 | Thalhammer et al. | |
| 9,417,331 B2 | 8/2016 | Valentino et al. | |
| 9,508,885 B1 | 11/2016 | Li et al. | |
| 9,603,577 B2 | 3/2017 | Oh et al. | |
| 10,105,652 B2 | 10/2018 | Medoff et al. | |
| 2002/0131552 A1* | 9/2002 | Nishizawa | A61B 6/583 378/65 |

(Continued)

*Primary Examiner* — Hoon K Song
(74) *Attorney, Agent, or Firm* — Cantor Colburn LLP (57) ABSTRACT

A method for determining a total radiation dosage received by an electronic component includes employing a radiation generator to expose the electronic component to an ionizing radiation within a contained environment of an inspection system. The method further includes measuring a total radiation dosage received by the electronic component based on a pre-determined position in the contained environment of the inspection system.

17 Claims, 5 Drawing Sheets

(56) References Cited

U.S. PATENT DOCUMENTS

| | | | | |
|---|---|---|---|---|
| 2002/0191744 | A1* | 12/2002 | Mirabella | A61G 3/001 378/102 |
| 2015/0071407 | A1* | 3/2015 | Watanabe | A61B 6/542 378/62 |
| 2015/0257723 | A1* | 9/2015 | Tajima | G01D 18/00 378/189 |

* cited by examiner

X-RAY DOSAGE MITIGATION FOR SEMICONDUCTORS AND MATERIAL INSPECTION SYSTEMS

BACKGROUND

The present disclosure relates to X-ray inspection, and more specifically, to X-ray dosage mitigation for semiconductors and material inspection systems.

As electronic components scale to smaller dimensions and new mounting techniques are used in wafer technology, inspection systems are needed to examine such components for defects. Semiconductor wafer inspection tasks include, for example, testing bond wires and bonding areas, as well as testing three-dimensional (3D) integrated circuit solder joints (e.g., micro bumps, copper pillars, and through-silicon vias) for defects such as cracks, open joints, or voids.

X-ray inspection tools are used to inspect electronic components, which can improve the production process. In particular, X-ray inspection can reduce end-of-line manual inspection, as well as can resolve quality issues.

SUMMARY

According to one or more embodiments of the present invention, a method for determining a total radiation dosage received by an electronic component includes employing a radiation generator to expose the electronic component to an ionizing radiation within a contained environment of an inspection system. The method further includes measuring a total radiation dosage received by the electronic component based on a pre-determined position in the contained environment of the inspection system.

According to other embodiments of the present invention, a system for determining a total radiation dosage received by an electronic component includes a processor in communication with one or more types of memory. The processor is configured to employ a radiation generator to expose the electronic component to an ionizing radiation within a contained environment of an inspection system. The processor is further configured to measure a total radiation dosage received by the electronic component based on a pre-determined position in the contained environment of the inspection system.

According to some embodiments of the present invention, a computer program product for determining a total radiation dosage received by an electronic component. The computer program product includes a computer readable storage medium readable by a processing circuit and storing program instructions for execution by the processing circuit for performing a method. The method includes employing a radiation generator to expose the electronic component to an ionizing radiation within a contained environment of an inspection system. The method also includes measuring a total radiation dosage received by the electronic component based on a pre-determined position in the contained environment of the inspection system.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Turning now to an overview of technologies that are more specifically relevant to aspects of the invention, X-ray inspection tools can induce latent damage to electronic components, such as semiconductor parts and/or materials. Integrated circuits subjected to any form of radiation, ionizing or non-ionizing, can incur some amount of damage depending on the total absorbed dose levels exposure (e.g., greater than 100 Rads). Although most X-ray inspections for high-quality imaging use ionizing dose amounts that are considered inconsequential for device failure or non-functionality, the degree of latent damage must be carefully considered. However, currently available X-ray inspection systems cannot measure total X-ray dosage in real time.

Turning now to an overview of the aspects of the invention, one or more embodiments of the invention address the above-described issues related to X-ray inspection by providing systems, methods, and computer software products that measure total X-ray dosage incurred by electronic components (e.g., including semiconductors and other materials) during X-ray inspection. Total X-ray dosages inside areas of the inspection system are mapped in space. Mapping can be static (e.g., point based), two-dimensional (2D), or three-dimensional (3D). A signal or alarm can be triggered when a total X-ray dosage limit is reached.

The above-described aspects of the invention may address the shortcomings of the prior art by providing methods, systems, and computer program products that mitigate X-ray dose induced damage to electronic components during X-ray inspection. The systems, methods, and computer software can reduce or eliminate latent damage induced by X-rays during inspection.

Figure 1:
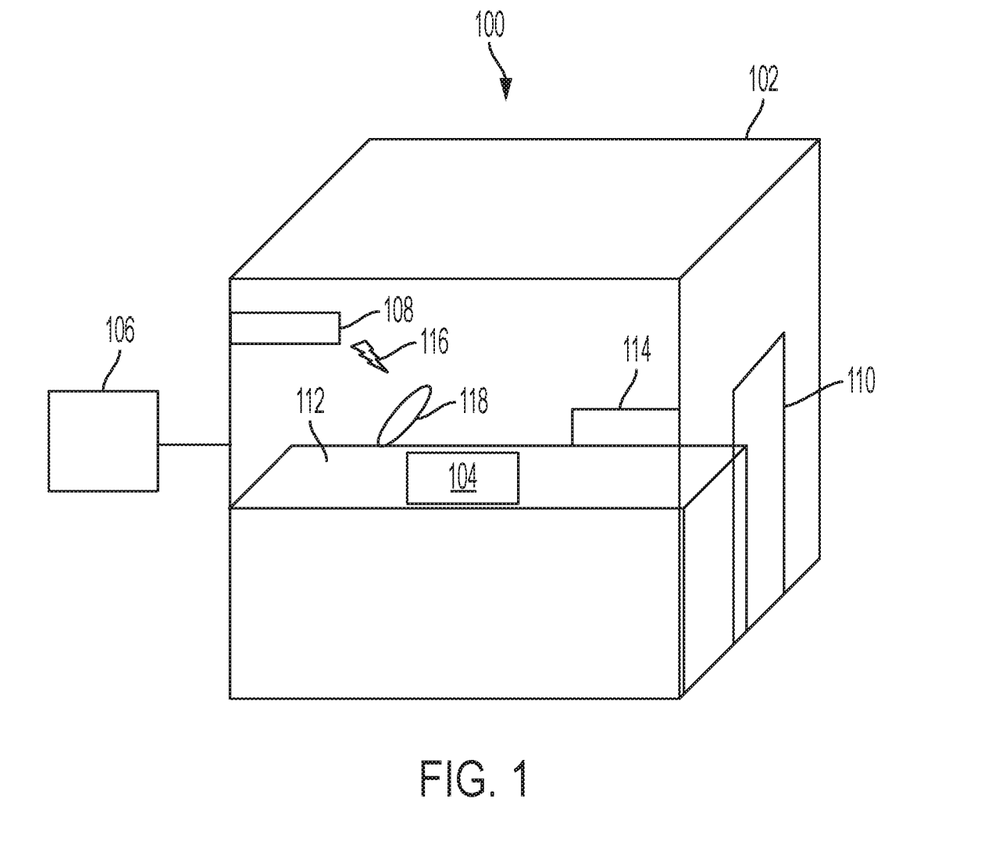
FIG. 1 is a perspective view of a system for measuring total radiation dosage for a component according to embodiments of the present invention.

Turning now to a more detailed description of aspects of the present invention, FIG. 1 is a perspective view of a system 100 for measuring total radiation dosage for an electronic component 104 according to embodiments of the present invention. The electronic component 104 is an electronic part or material, for example, a semiconductor component, part, or material. In a specific embodiment, the electronic component 104 is an electronic part that includes one or more semiconductor materials. The electronic component 104 is a complete functioning electronic part in some embodiments. Yet, in other embodiments, the electronic component 104 includes electronic materials only (e.g., semiconductor materials only). Non-limiting examples of components 104 include semiconductor wafers with bonding wires and/or bonding areas, three-dimensional (3D)

integrated circuit solder joints, e.g., micro bumps, copper pillars, and through-silicon vias.

The system 100 includes a housing 102 that provides a contained environment for testing or inspecting components by radiation, such as X-ray radiation, for damage or defects. Types of damage tested for include, but are not limited to, cracks, open joints, voids, and/or misalignment. The housing 102 providing the contained environment can have any shape or dimensions. The housing 102 can include a door 110 that provides entry into the housing 102.

The electronic component 104 is arranged within the housing 102 on a surface 112. The surface 112 is shown for illustrative purposes only and is not drawn to scale. The surface 112 can be any type of surface that is not limited to a flat surface such as shown in FIG. 1.

The system 100 includes a radiation generator 108 that generates ionizing radiation 116. The radiation generator 108 is an X-ray tube or other X-ray generating source that generates ionizing radiation that includes of X-rays according to some embodiments of the present invention.

The system 100 also includes at least one radiation detector 114. The at least one radiation detector 114 detects and measures the ionizing radiation 116 generated by the radiation generator 108. In one embodiment, the radiation detector 114 is a radiation dosimeter device. Such a device can measure the derived air concentration (DAC) of the ionizing radiation 116. The radiation detector 114 is arranged within the housing 102. The position of the radiation detector 114 shown in FIG. 1 is for illustrative purposes only and is not intended to limit the position of the radiation detector 114. The radiation detector 114 can be arranged closer to or further away from the electronic component 104.

According to some embodiments of the present invention, the system 100 includes a plurality of radiation detectors 114 arranged in different areas of the contained environment within the housing 102. In some embodiments, the volume of space within the contained environment is divided into 3D sections, and a separate radiation detector 114 is arranged in each of the 3D sections, which is described in further detail with reference to FIG. 3 below.

The system 100 includes, optionally, one or more filters 118 through with the ionizing radiation 116 passes before reaching the electronic component 104. The filter 118 includes a material, e.g., aluminum, zinc, or copper, that reduces the intensity of particular wavelengths from the ionizing radiation 116 spectrum (e.g., X-ray beam) and selectively alters the distribution of wavelengths within a given beam of ionizing radiation.

Figure 2:
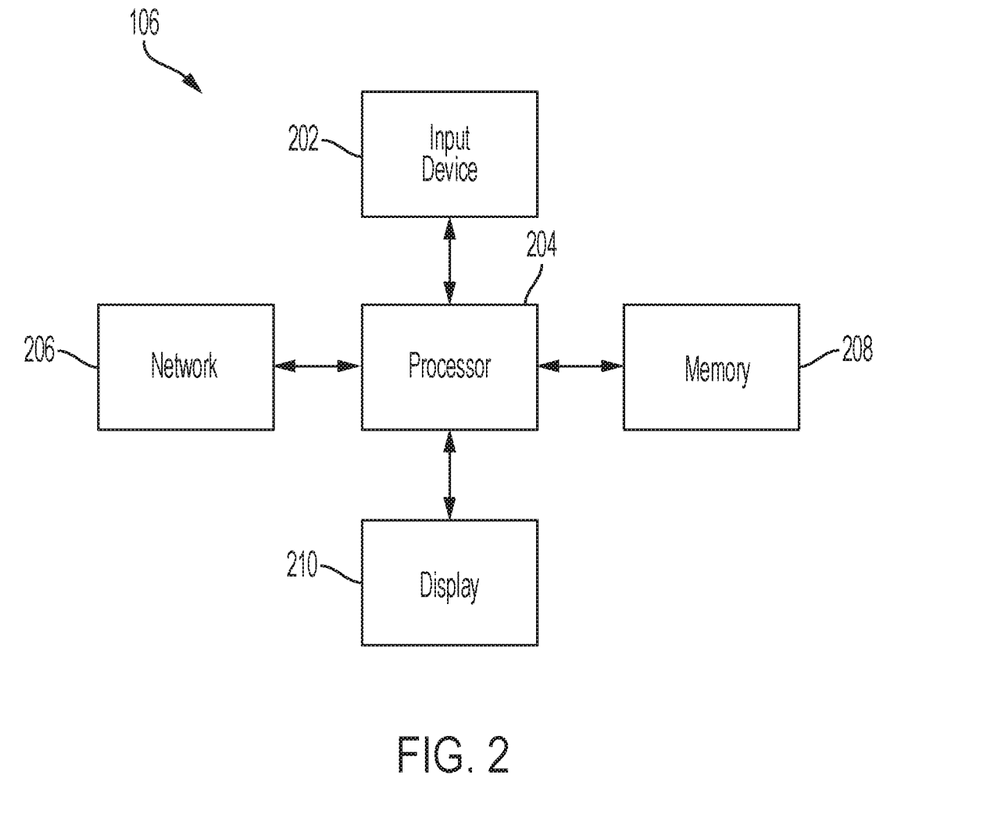
FIG. 2 is a schematic diagram of a controller for controlling a system for measuring total radiation dosage for a component according to embodiments of the present invention.

The system 100 further includes a controller 106 that controls the system 100. FIG. 2 is a schematic diagram of the controller 106 for controlling the system 100. The controller 106 includes a processor 204. As illustrated, the processor is connected to an input device 202, a network 206, a memory 208, and a display 210. Of course, one or more of these elements could be included within the processor (e.g., memory) and not all of them a required. In the illustrated exemplary embodiments, the input device 202 can include a keyboard, touchpad, mouse, and/or touch screen device, and the network 206 can include a local area network or the Internet. The display 210 can include a screen, touch screen device or digital display. In some embodiments of the present invention, the controller 106 includes a personal computer, smart phone or tablet device communicatively connected to the system 100.

Figure 3:
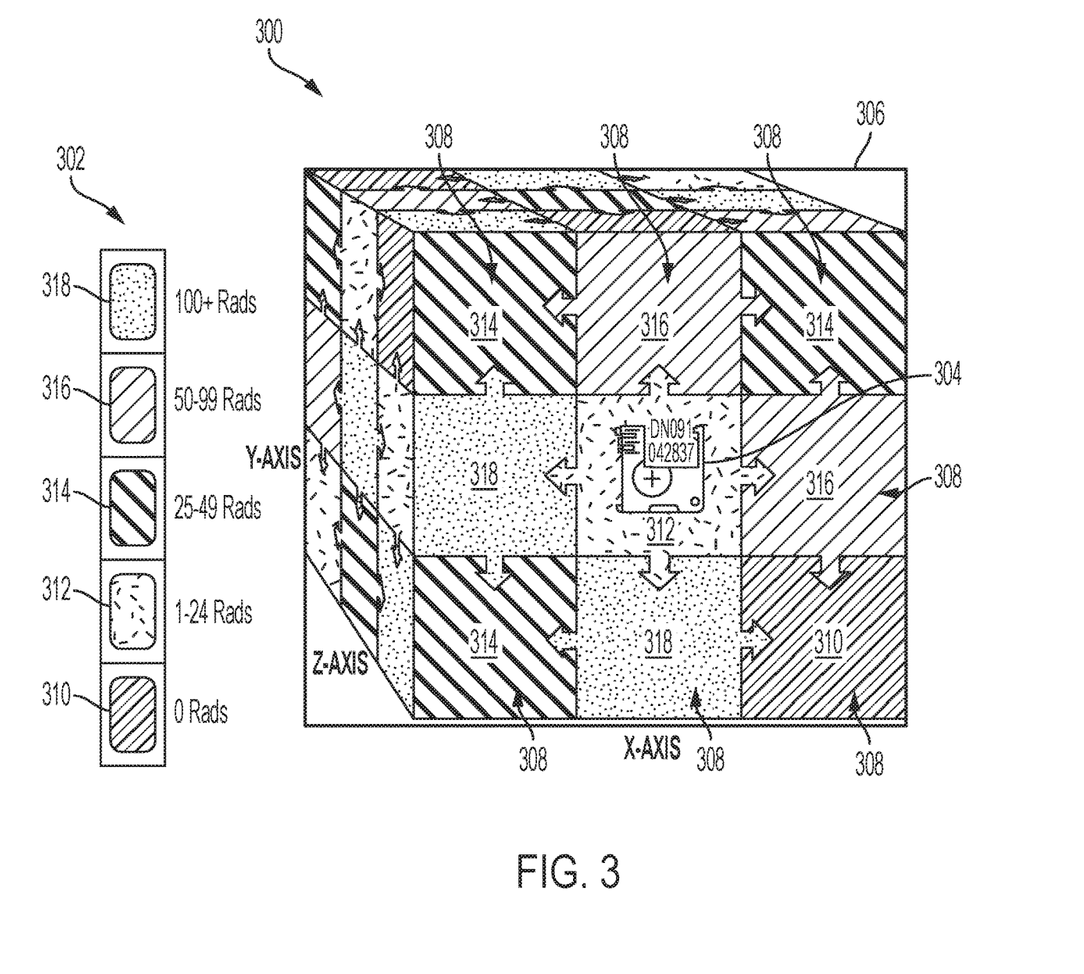
FIG. 3 is three-dimensional (3D) radiation dosage map according to embodiments of the present invention.

FIG. 3 is three-dimensional (3D) radiation dosage map 300 according to embodiments of the present invention. The dosage map 300 provides a 3D map of radiation dosage within predetermined 3D areas within the housing 306 providing the contained environment of the inspection system. The area or 3D volume within the housing that is exposed to radiation, e.g., X-rays, from the radiation generator is divided into sections 308. The sections 308 are 3D sections with three dimensions, including a first dimension along the x-axis (length), a second dimension along the y-axis (height), and a third dimension along the z-axis (width), as shown in FIG. 3.

The radiation dosage within each section 308 measured, such as by one or more dosimeters, and the total radiation dosage in each section 308 is mapped to a radiation scale 302 (or legend). The radiation scale 302 can be divided into any number of radiation ranges. In the exemplary embodiments shown in FIG. 3, the radiation scale 302 includes no measured radiation 310 (0 Rads), low radiation dosage 312 (1-24 Rads), medium radiation dosage 314 (25-49 Rads), high radiation dosage 316 (50-99 Rads), and very high radiation dosage 318 (100+ Rads).

The component 304 to be inspected is arranged at a certain position within the open 3D volume of the housing 306. Depending on the position in the mapped 3D area of the housing 306, the total radiation dosage that the component is exposed to can be determined. As shown in the example in FIG. 3, the component 304 is exposed to a low radiation dosage 312 (1-24 Rads). After creating the 3D dosage map, the mapped sections 308 can be added together to determine the total radiation dosage for a component that is large and arranged in more than one section 308.

Figure 4:
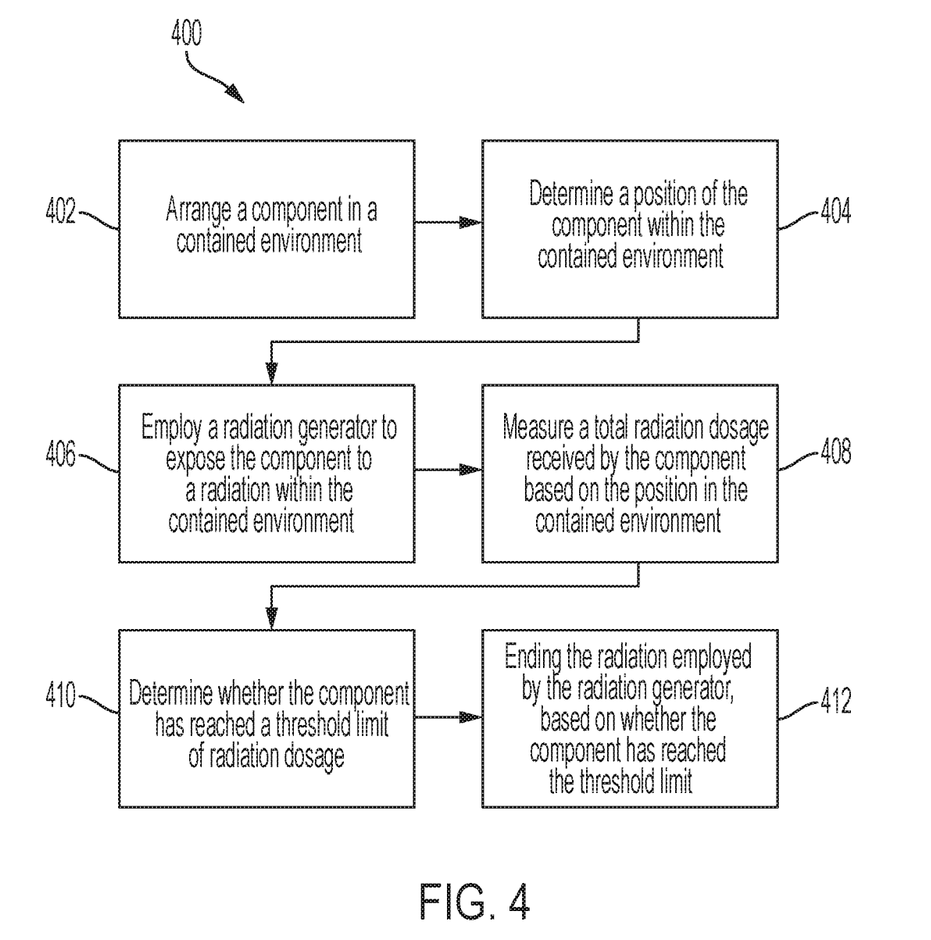
FIG. 4 is a flow chart illustrating a method for measuring total radiation dosage received by a component according to embodiments of the present invention.

FIG. 4 is a flow chart illustrating a method 400 for measuring total radiation dosage received by a component according to embodiments of the present invention. As shown in block 402, the method 400 includes arranging a component in a contained environment. The contained environment is surrounded by a housing with an open 3D interior volume. The contained environment can be part of X-ray inspection equipment.

The method includes, as shown in block 404, determining a position of the component within the contained environment. The position of the component within the 3D space of the contained environment is determined by, for example, using three-axes, an x-axis, y-axis, and z-axis (see also FIG. 3).

The method 400 includes, as shown in block 406, employing a radiation generator to expose the component to a radiation within the contained environment. The radiation can be ionizing radiation, e.g., X-rays, from an X-ray tube.

The method 400 further includes, as shown in block 408, measuring a total radiation dosage received by the component based on the position in the contained environment. The position in the contained environment is pre-determined. The total radiation dosage can be measured by a dosimeter arranged in the contained environment of the inspection system that measures the derived air content of radiation. The dosimeter is a stand-alone (static) measurement device according to some embodiments of the present invention. The dosimeter is integrated into the inspection system itself according to some other embodiments of the present invention.

The method 400 also includes, as shown in block 410, determining whether the component has reached (or exceeded) a threshold limit of radiation dosage. The threshold limit is predetermined. An alarm or other signal can be triggered if the total radiation dosage received by the component is reached. The threshold limit can be a total dosage of radiation known to induce undesired damage to the component. The alarm or other signal can alert the operator to manually turn off the radiation generator so that the component does not receive additional radiation.

The method 400 includes, as shown in block 412, ending the radiation employed by the radiation generator, based on whether the component has reached the threshold limit. Ending the radiation generated can be automatically triggered by the system based on the predetermined threshold limit.

Figure 5:
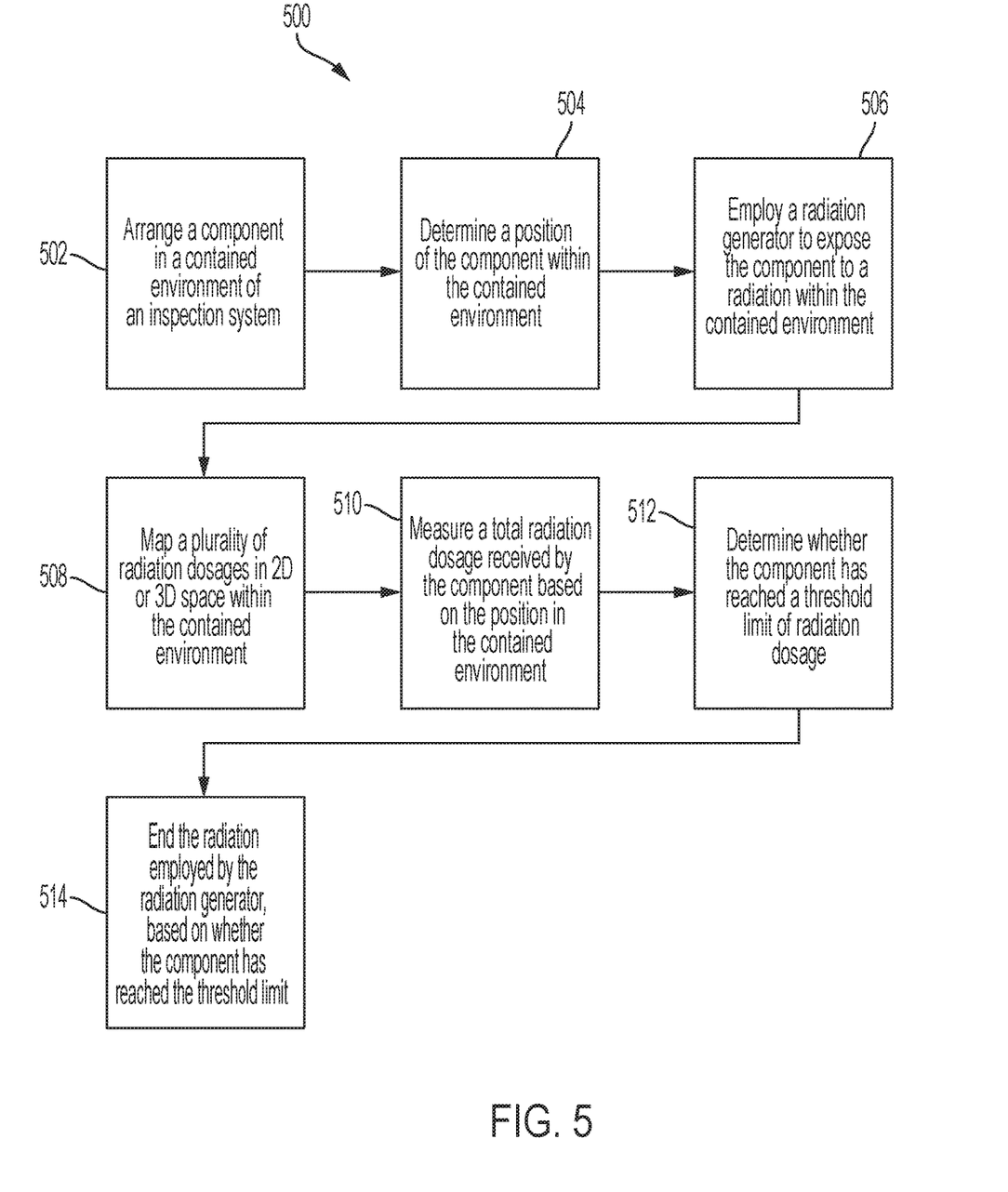
FIG. 5 is a flow chart illustrating a method for measuring total radiation dosage received by a component according to embodiments of the present invention.

FIG. 5 is a flow chart illustrating a method 500 for measuring total radiation dosage received by a component according to embodiments of the present invention. As shown in block 502, the method 400 includes arranging a component in a contained environment of an inspection system. The contained environment is surrounded by a housing with an open 3D interior volume. The inspection system can be an X-ray inspection system.

The method 500 includes, as shown in block 504, determining a position of the component within the contained environment. The position of the component within the 3D space of the contained environment is determined by, for example, using three axes, an x-axis, y-axis, and z-axis (see also FIG. 3). The position of the component within the contained environment also can be determined in 2D space using two axes, an x-axis and a y-axis, or an x-axis and a z-axis (see FIG. 3).

The method 500 includes, as shown in block 506, employing a radiation generator to expose the component to a radiation within the contained environment. The radiation can be ionizing radiation, e.g., X-rays, from an X-ray tube.

The method 500 further includes, as shown in block 508, mapping a plurality of radiation dosages in 2D or 3D space within the contained environment. The plurality of radiation dosages can be mapped as shown in FIG. 3, for example.

According to some embodiments of the present invention, 2D or 3D mapping of the radiation dosages within the contained environment is performed by mapping over a period of time. For example, a series of frames (i.e., dependent on the frame rate of the radiation detector), each with radiation maps, can be combined and used to provide a 2D or 3D map. In another example, multiple radiation detectors can be used, and each can be rotated to minimize directional sensitivity of the detector(s). Radiation detected with each detector can combined to provide the 2D or 3D map.

The method 500 includes, as shown in block 510, measuring a total radiation dosage received by the component based on the position in the contained environment. The position is pre-determined. The total radiation dosage can be measured by at least one dosimeter (including a plurality of dosimeters) arranged in the contained environment of the inspection system that measures the derived air content of radiation. The at least one dosimeter is a stand-alone (static) measurement device according to some embodiments of the present invention. The at least one dosimeter is integrated into the inspection system itself according to some other embodiments of the present invention.

Dynamic positions in 3D space can be integrated via derived air content measurements according to some embodiments of the present invention. 2D or 3D mapping of the dosages can be recorded or plotted according to other embodiments of the present invention.

The method 500 also includes, as shown in block 512, determining whether the component has reached (or exceeded) a threshold limit of radiation dosage. The threshold limit is predetermined. An alarm or other signal can be triggered if the total radiation dosage received by the component is reached. The threshold limit can be a total dosage of radiation known to induce undesired damage to the component. The alarm or other signal can alert the operator to manually turn off the radiation generator so that the component does not receive additional radiation.

The method 500 includes, as shown in block 514, ending the radiation employed by the radiation generator, based on whether the component has reached the threshold limit. Ending the radiation generated can be automatically triggered by the system based on the predetermined threshold limit.

For each threshold limit for each component, various other parameters can be adjusted so that the component does not reach the threshold limit of total radiation exposure. For example, time for radiation exposure, x-ray kV, distance from the radiation generator, and radiation filters are variables that can be adjusted so that the component does not reach the threshold limit of radiation that induces damage. The above described methods and systems allow for preventative maintenance applications. The dosage map can be used to guide operating settings, distances, and times in order to stay below a certain threshold limit.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, a tape drive, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining a total radiation dosage received by an electronic component, the method comprising:
    employing a radiation generator to expose the electronic component to an ionizing radiation within a contained environment of an inspection system; and
    measuring a total radiation dosage received by the electronic component based on a pre-determined position in the contained environment of the inspection system;
    wherein the total radiation dosage is measured by creating a radiation dosage map using a dosimeter that measures derived air content of radiation within three-dimensional space of the contained environment.

2. The method of claim 1, wherein the ionizing radiation comprises X-rays.

3. The method of claim 1 further comprising, subsequent to employing the radiation generator, mapping a plurality of radiation dosages within the contained environment.

4. The method of claim 1 further comprising determining a position of the electronic component within the contained environment.

5. The method of claim 1 further comprising, subsequent to measuring a total radiation dosage, determining whether the electronic component has reached a threshold limit of radiation dosage.

6. The method of claim 5 further comprising ending the radiation employed by the radiation generator, based on whether the electronic component has reached the threshold limit.

7. A system for determining a total radiation dosage received by an electronic component, the system comprising:
    a processor in communication with one or more types of memory, the processor configured to:
    employ a radiation generator to expose the electronic component to an ionizing radiation within a contained environment of an inspection system; and
    measure a total radiation dosage received by the electronic component based on a pre-determined position in the contained environment of the inspection system;
    wherein the total radiation dosage is measured by creating a radiation dosage map using a dosimeter that measures derived air content of radiation within three-dimensional space of the contained environment.

8. The system of claim 7, wherein the ionizing radiation comprises X-rays.

9. The system of claim 7, wherein the processor is further configured to, subsequent to employ the radiation generator, map a plurality of radiation dosages within the contained environment.

10. The system of claim 7, wherein the processor is further configured to determine a position of the electronic component within the contained environment.

11. The system of claim 7, wherein the processor is further configured to, subsequent to measure a total radiation dosage, determine whether the electronic component has reached a threshold limit of radiation dosage.

12. The system of claim 11, wherein the processor is further configured to end the radiation employed by the radiation generator, based on whether the electronic component has reached the threshold limit.

13. A computer program product for determining a total radiation dosage received by an electronic component, the computer program product comprising:
    a computer readable storage medium readable by a processing circuit and storing program instructions for execution by the processing circuit for performing a method comprising:
    employing a radiation generator to expose the electronic component to an ionizing radiation within a contained environment of an inspection system; and
    measuring a total radiation dosage received by the electronic component based on a pre-determined position in the contained environment of the inspection system;
    wherein the total radiation dosage is measured by creating a radiation dosage map using a dosimeter that measures derived air content of radiation within three-dimensional space of the contained environment.

14. The computer program product of claim 13, wherein the ionizing radiation comprises X-rays.

15. The computer program product of claim 13, wherein the method further comprises determining a position of the electronic component within the contained environment.

16. The computer program product of claim 13, wherein the method further comprises, subsequent to measuring a total radiation dosage, determining whether the electronic component has reached a threshold limit of radiation dosage.

17. The method of claim 1, wherein the contained environment is a housing.

* * * * *